(12) United States Patent
Allen et al.

(10) Patent No.: US 9,946,786 B2
(45) Date of Patent: *Apr. 17, 2018

(54) SEARCHING CODE BASED ON LEARNED PROGRAMMING CONSTRUCT PATTERNS AND NLP SIMILARITY

(71) Applicant: International Business Machines Corporation, Armonk, NY (US)

(72) Inventors: Corville O. Allen, Morrisville, NC (US); Andrew R. Freed, Cary, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,997

(22) Filed: Mar. 11, 2016

(65) Prior Publication Data

US 2016/0283347 A1 Sep. 29, 2016

Related U.S. Application Data

(63) Continuation of application No. 14/665,089, filed on Mar. 23, 2015.

(51) Int. Cl.
*G06F 9/44* (2006.01)
*G06F 17/30* (2006.01)
(Continued)

(52) U.S. Cl.
CPC .......... *G06F 17/30654* (2013.01); *G06F 8/36* (2013.01); *G06F 8/433* (2013.01);
(Continued)

(58) Field of Classification Search
CPC ................. G06F 8/65; G06F 17/30654; G06F 17/30684; G06F 8/36; G06F 11/60;
(Continued)

(56) References Cited

U.S. PATENT DOCUMENTS 6,829,603 B1 * 12/2004 Chai ................. G06F 17/30684
7,827,537 B2 11/2010 Nandakumaraiah
(Continued)

FOREIGN PATENT DOCUMENTS

WO 2013158758 10/2013

OTHER PUBLICATIONS

Ugurel et al., "What's the Code? Automatic Classification of Source Code Archives," SIGKDD '02, The Eighth ACM SIGKDD International Conference on Knowledge Discovery and Data Mining, Edmonton, AB, Canada, Jul. 2002, pp. 632-638.
(Continued)

*Primary Examiner* — Tuan Vu
(74) *Attorney, Agent, or Firm* — VanLeeuwen & VanLeeuwen; Diana R. Gerhardt

(57) ABSTRACT

An approach is provided to ingest software source code files into a question/answering (QA) system. During ingestion, source code blocks are classified to identify one or more constructs in the blocks as being domain-specific. Relationships between the blocks are then mapped. Software compliance regulations are ingested into the QA system. Using the QA system, a source code file is analyzed for compliance to the software compliance regulations. The analysis identifies code sections within the source code file as being domain-specific and subject to the ingested set of software compliance regulations.

5 Claims, 6 Drawing Sheets

(51) Int. Cl.
*G06F 11/36* (2006.01)
*G06F 9/45* (2006.01)
(52) U.S. Cl.
CPC ............ *G06F 8/71* (2013.01); *G06F 11/3688* (2013.01); *G06F 17/30598* (2013.01); *G06F 17/30684* (2013.01)
(58) Field of Classification Search
CPC ........ G06F 17/30554; G06Q 10/06395; G06Q 10/10; G09B 7/00
See application file for complete search history.

(56) References Cited

U.S. PATENT DOCUMENTS

| | | | |
|---|---|---|---|
| 8,494,851 B2 | 7/2013 | DeLuca et al. | |
| 9,378,273 B2 | 6/2016 | Chu-Carroll et al. | |
| 9,471,877 B1 | 10/2016 | Diamanti et al. | |
| 2005/0289340 A1 | 12/2005 | Camenisch | |
| 2006/0059253 A1* | 3/2006 | Goodman | G06Q 10/10 709/223 |
| 2006/0080656 A1* | 4/2006 | Cain | G06F 8/65 717/174 |
| 2008/0263505 A1 | 10/2008 | St Clair et al. | |
| 2009/0287678 A1* | 11/2009 | Brown | G06F 17/30654 |
| 2009/0292687 A1* | 11/2009 | Fan | G06F 17/30654 |
| 2010/0106705 A1 | 4/2010 | Rush et al. | |
| 2011/0125734 A1* | 5/2011 | Duboue | G09B 7/00 707/723 |
| 2011/0283260 A1 | 11/2011 | Bucuvalas | |
| 2013/0024942 A1 | 1/2013 | Wiegenstein et al. | |
| 2013/0145347 A1 | 6/2013 | Karr et al. | |
| 2013/0152061 A1 | 6/2013 | Golde et al. | |
| 2013/0204874 A1 | 8/2013 | Frey | |
| 2014/0331200 A1* | 11/2014 | Wadhwani | G06Q 10/06395 717/101 |
| 2016/0196491 A1 | 7/2016 | Chandrasekaran et al. | |

OTHER PUBLICATIONS

McMillan et al., "Categorizing Software Applications for Maintenance," 27th IEEE ICSM'11, Proceedings of the 2011 27th IEEE International Conference on Software Maintenance, Williamsburg, VA, Sep. 2011, 10 pages.

Rigdon, "Static Analysis Considerations for Medical Device Firmware," In Proceedings of the Embedded Systems Conference, Boston, MA, Sep. 2010, 21 pages.

Lin, "Leveraging Code Comments to Improve Software Reliability," ProQuest LLC, 789 East Eisenhower Parkway, PO Box 1346, Ann Arbor, MI 48106, 2009.

Fry et al. "Analysing source code: looking for useful verb-direct object pairs in all the right places," The Institute of Engineering and Technology 2008, IET Software, 2 (1), Sep. 2007, pp. 27-36.

Subramanian et al., "Making sense of online code snippets," Proceedings of the Tenth International Workshop on Mining Software Repositories, San Francisco, CA, May 2013, pp. 85-88.

Wong et al., "AutoComment: Mining question and answer sites for automatic comment generation," 2013 IEEE/ACM 28th International Conference on Automated Software Engineering (ASE), Palo Alto, CA, Nov. 2013, pp. 562-567.

Kimmig et al., "Querying Source Code with Natural Language," ASE '11 Proceedings of the 2011 26th IEEE/ACM International Conference on Automated Software Engineering, Lawrence, KS, Nov. 2011, 4 pages.

Cox, "Regular Expression Matching with a Ingram Index or How Google Code Search Worked," Jan. 2012, 8 pages.

Mossienko, "Structural Search and Replace: What, Why, and How-to," JetBrains, 2006, 5 pages.

"List of IBM Patents or Patent Applications Treated as Related," Letter from Leslie A. Van Leeuwen, Mar. 11, 2016, 1 page.

Allen et al., "Searching Code Based on Learned Programming Construct Patterns and NLP Similarity," U.S. Appl. No. 14/665,089, filed Mar. 23, 2015, 45 pages.

* cited by examiner

SEARCHING CODE BASED ON LEARNED PROGRAMMING CONSTRUCT PATTERNS AND NLP SIMILARITY

BACKGROUND

Code reuse, also called software reuse, is the use of existing software, or software knowledge, to build new software. Code reuse has been in use from the earliest days of programming with programmers reusing sections of code, templates, functions, and procedures. The goal of code reuse is to save time and resources and reduce redundancy by taking advantage of code that has already been created. Code reuse implies the creation of a separately maintained version of the reusable code.

Some domains are heavily regulated for software programmers and complying with these regulations is difficult. Furthermore, mistakes made that lead to non-compliance have serious financial or legal consequences. For instance, in the medical domain the Food and Drug Administration (FDA) requires strict documentation of all medical algorithms used including a full "breadcrumb"/audit trail that describes exactly what evidence source was used to create the software algorithm/calculation. Thus, building a compliant solution in a regulated industry has two problems: #1 being able to find all instances of algorithms that need to be documented and #2 verifying that proof of documentation is present for each algorithm.

BRIEF SUMMARY

According to one embodiment of the present disclosure, An approach is provided to ingest software source code files into a question/answering (QA) system. During ingestion, source code blocks are classified to identify one or more constructs in the blocks as being domain-specific. Relationships between the blocks are then mapped. Software compliance regulations are ingested into the QA system. Using the QA system, a source code file is analyzed for compliance to the software compliance regulations. The analysis identifies code sections within the source code file as being domain-specific and subject to the ingested set of software compliance regulations The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
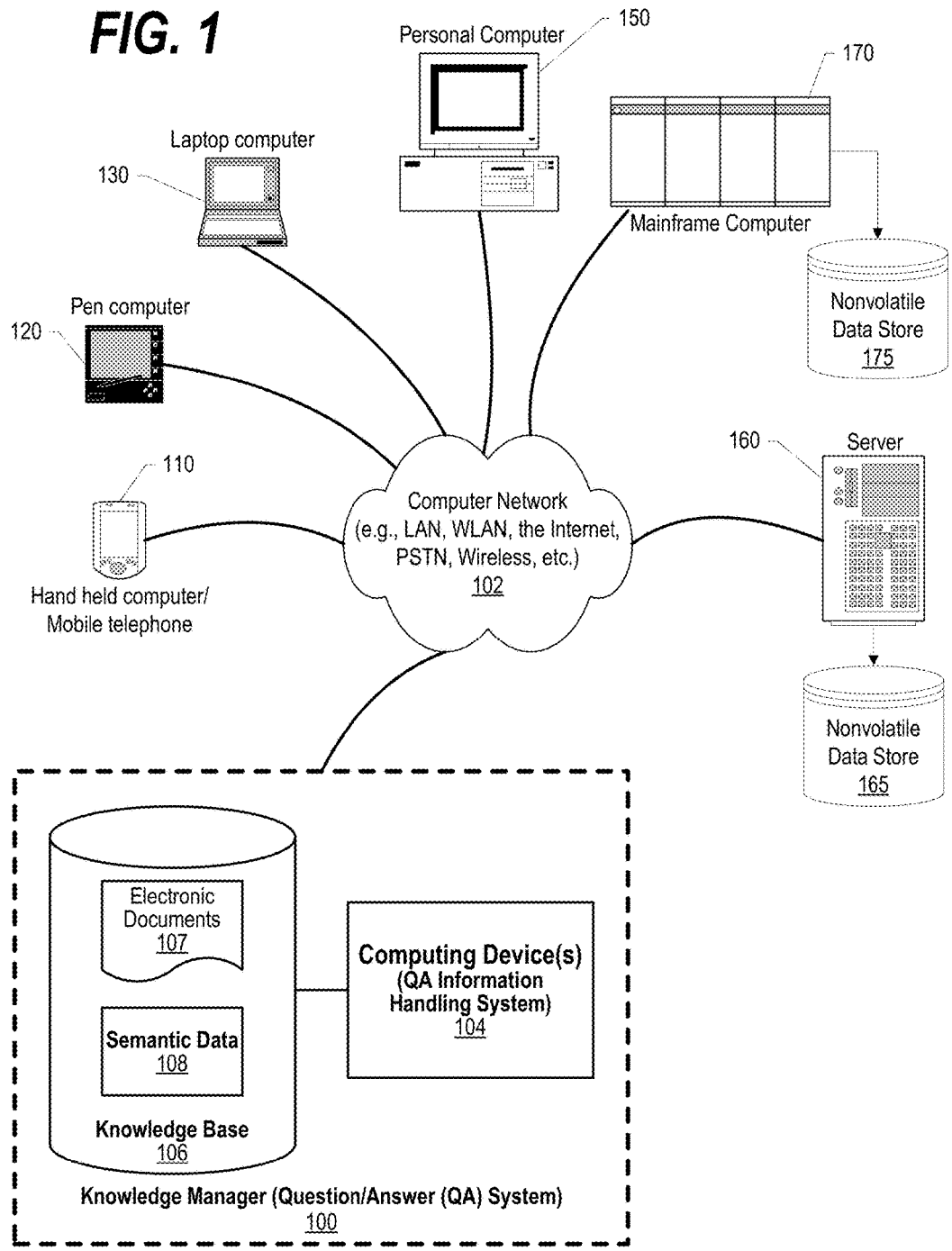
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
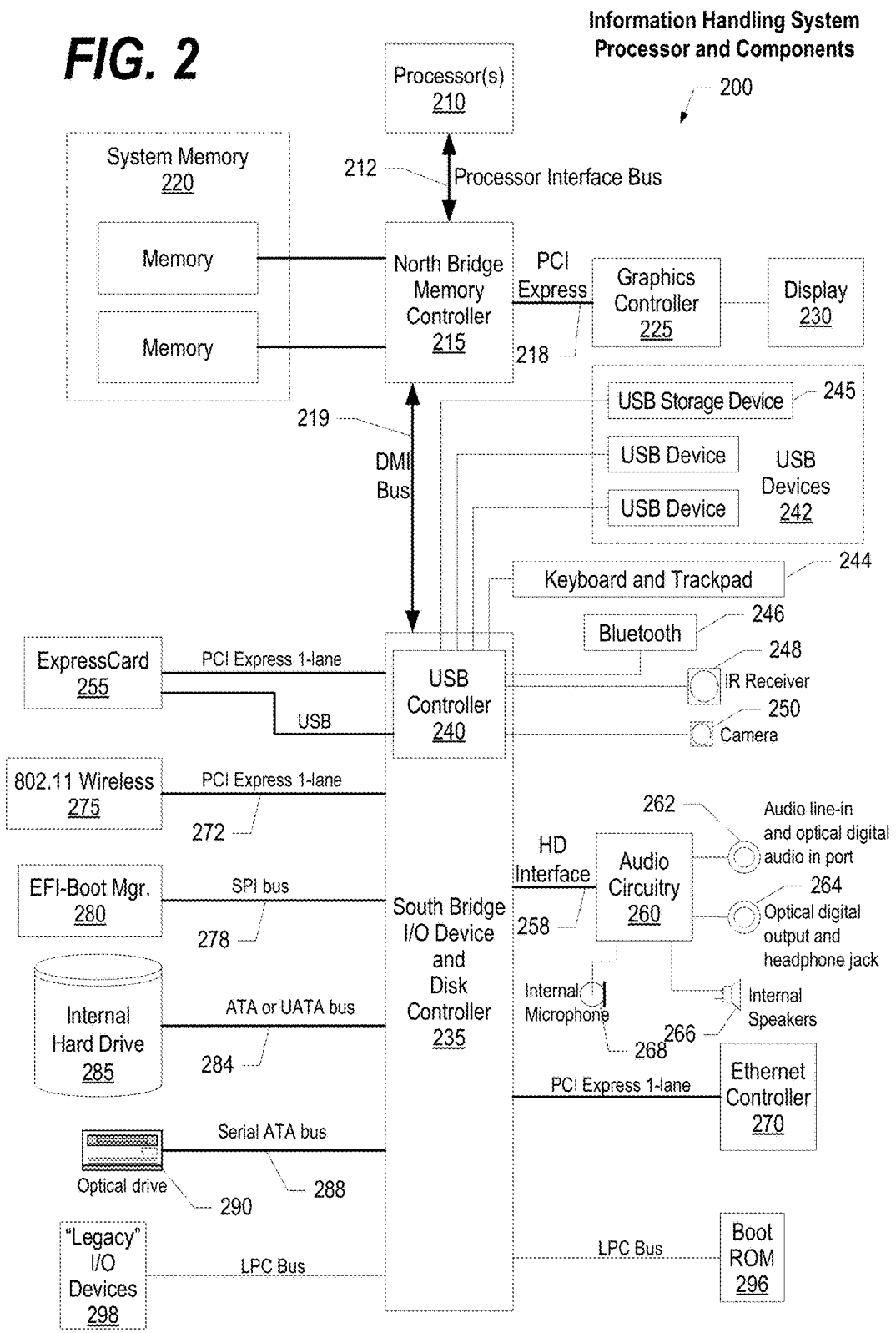
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-6 depict an approach that uses a question answering (QA) system to analyze software code based on learned programming construct patterns and natural language processing (NLP) similarities to compliance regulations. Compliance requirements are affecting an increasing number of business processes. Many specialized processes are being designed solely to meet industry specific regulations. As various compliance initiatives become more intertwined from regulatory and organizational perspectives, the use of multiple and disparate compliance solutions can lead to duplicate, and often contradictory, processes and documentation. Such environments do not provide clear visibility into organizations' risk and compliance profiles. They also reduce efficiency, and escalate the cost of compliance.

Using the approach provided herein, software code is ingested into the QA system for a particular domain, such as software dealing with health care and patient records. In addition, regulations, such as laws, policies, and the like, promulgated by a government regulatory body or other compliance organization, are also ingested into the QA system. With the base of knowledge ingested into the QA system, software code being developed for the domain, such as a new or improved patient-management system for a hospital, is analyzed based upon the ingested base of knowledge including the previously ingested software code for the domain as well as the previously ingested software compliance regulations. During analysis, NLS questions are formulated based on the various constructs found in the software code that is being analyzed. Using the patient software example, a construct such as routine named "Retrieve_Patient_Record" would be selected and a NLS question formulated such as "Is the 'Retrieve_Patient_Record' routine subject to any health care regulations?" This question is submitted to the QA system that has a knowledge base of other health care software programs and the health care regulations that were previously ingested. The QA system responds with an answer and a confidence level.

For example, the above-question may receive an answer that the routine is subject to a particular health care regulation with a confidence score of 95 out of a possible 100, indicating a high confidence that the software routine is subject to the cited regulation. The QA system is able to provide the regulation and a high confidence value when other software previously ingested programs have routines with the same or similar names that were noted as being subject to the cited regulation. If other software programs do not have similar routine names, then the QA system can parse the question into component parts with the result being that the routine deals with "patient names" and can also obtain a high confidence value by comparing the words and phrases to words and phrases found in the compliance regulations. In this case, the QA system would identify the cited regulation based on the ingested compliance regulations. Using a combination of both the previously ingested software code and the ingested software compliance regulations further bolster the QA system's confidence level that the posed question is subject to the cited regulation.

In one embodiment, multiple answers can be returned by the QA system with each answer having its own confidence level. Using the example from above, the QA system may find a first regulation dealing with the handling of patient names and calculate a confidence value of 95/100, a second regulation dealing with patient confidentiality and calculate a confidence value of 88/100, and a third regulation dealing with inter-hospital communications and assign a lower confidence value of 35/100. A threshold can be applied so that candidate answers with lower scores are filtered out. In this case, if a threshold value of 75 is established then the first and second regulations would be noted as likely applying to the selected routine dealing with retrieving patient records, and the third regulation would be filtered out as it is unlikely that the routine, with the given data, deals with inter-hospital communication. Of course, other variables and programming constructs in the routine may increase or decrease the confidence value pertaining to each of the regulations and may further result in the inclusion of other compliance regulations.

Figure 3:
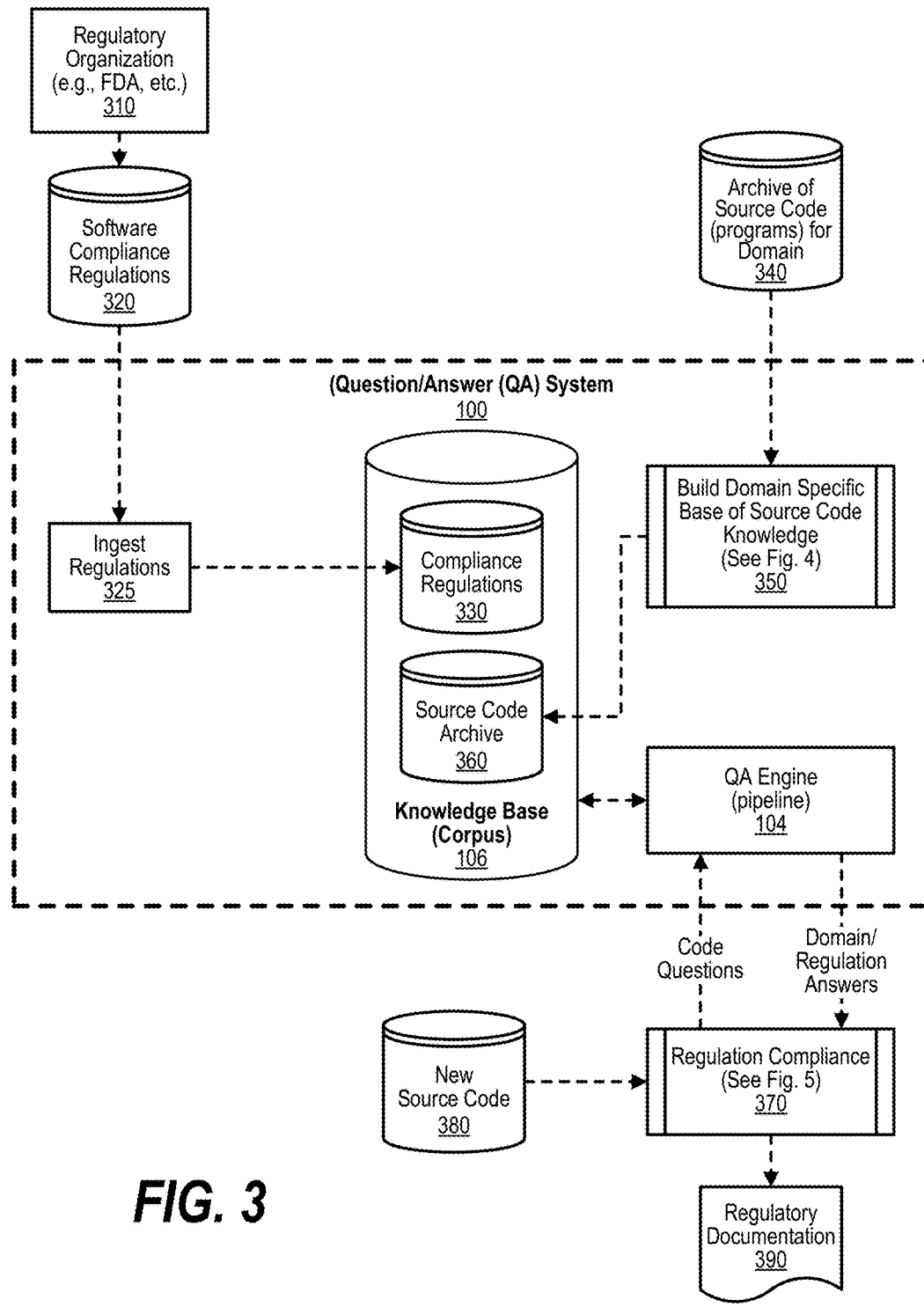
FIG. 3 is an exemplary diagram showing processes and data stores utilized to search software source code based on learned programming construct patterns and natural language processing (NLP) similarities.

FIG. 3 is an exemplary diagram showing processes and data stores utilized to search software source code based on learned programming construct patterns and natural language processing (NLP) similarities. Question answering (QA) system 100 includes knowledge base 106, also referred to as a "corpus" that is used by QA Engine 104 to answer submitted questions.

The domain that is being addressed, such as health care, often has one or more regulatory organizations, such as the FDA, that promulgate software compliance regulations 320. Software developed for the domain (e.g., health care, etc.) is subject to these software compliance regulations. For example, certain documentation may be required when software being developed by the software developer performs certain tasks. In the health care industry, certain documentation is required when software performs certain tasks related to patient identifies, such as names, identification numbers, and the like. In the case of health care, such regulations are often enacted to protect patients' identify and their privacy, such as ailments patients have experienced or treatments that the patients have received. Process 325 ingests the regulations promulgated by the regulatory organization(s). After ingestion, the compliance regulations are depicted as data store 330 which is part of the QA system's corpus (knowledge base 106).

In many industries, such as health care, many software programs have already been written that were previously made to comply with the software compliance regulations. Archive 340 depicts a body of source code previously written, and documented, that performs tasks and functions in the regulated industry. In the health care field, such tasks and functions would include handling of patient records and other health care related activities. Predefined process 350 ingests archive 340 in order to build a domain-specific base of source code knowledge (see FIG. 4 and corresponding text for processing details). After ingestion, the base of knowledge derived from the domain-specific source code are depicted as data store 360 which is part of the QA system's corpus (knowledge base 106). At this point, QA system 100 has been provided with domain-specific software compliance regulations (data store 330) as well as a base of source code knowledge that has already been written for the domain (data store 360).

QA system 100 is now ready to answer questions pertaining to new software programs being written for the domain. Predefined process 370 analyzes new source code file 380 (see FIG. 5 and corresponding text for processing details). As shown in greater detail in FIG. 5, predefined process 370 analyzes constructs included in source code file 380 and poses natural language questions to QA system 100 with the questions focused on whether various constructs and relationships (code sections) found in new source code file 380 are domain-specific (e.g., directed at the health care domain, etc.) and whether such code sections are subject to the software compliance regulations 330 previously ingested into the QA system's knowledge base 106. Armed with the regulations and the source code archive, the QA system is able to respond with an answer as to whether the code section is domain-specific and whether such code section is further subject to the software compliance regulations. Regulatory documentation 390 is output from predefined process 370 providing details as to the code sections in the new source code that are subject to the software compliance regulations. In one embodiment, regulatory documentation 390 includes specific citations, or references, to particular regulations. For example, in the health care domain, a software routine that retrieves a patient record would likely be subject to one or more regulations promulgated by the FDA.

Figure 4:
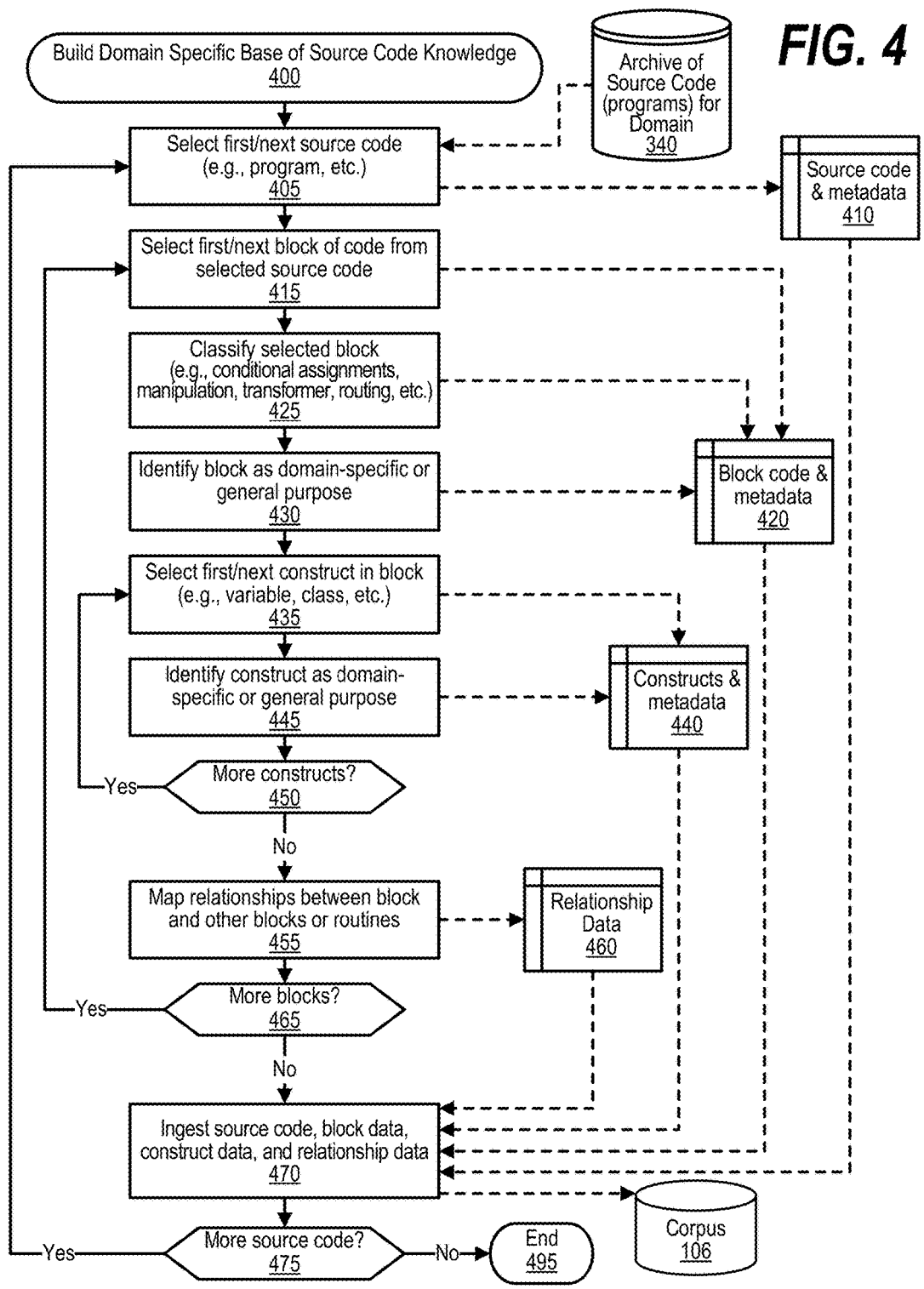
FIG. 4 is an exemplary flowchart showing steps performed to build a domain specific base of source code knowledge.

FIG. 4 is an exemplary flowchart showing steps performed to build a domain specific base of source code knowledge. FIG. 4 processing commences at 400 and shows the steps taken by a process that performs a routine that builds a domain-specific base of source code knowledge and ingests the domain-specific knowledge to a corpus, or knowledge base, utilized by a question answering (QA) system. At step 405, the process selects the first source code file (e.g., program, etc.) from source code archive 340. The selected source code and any metadata pertaining to the selected source code are stored in memory area 410. At step 415, the process selects the first block of code from the selected source code. The selected block, also referred to as a "code section," is written to memory area 420.

At step 425, the process classifies the selected block based on the operation(s) performed by the block. For example, the selected block could be a conditional assignment, a manipulation routine, a transformer function, a routing function, and the like. The classification of the selected code section is written to memory area 420. In one embodiment, the following process is used to classify code:
 1) Use prior art to classify all blocks/methods;
 2) Blocks are classified:
   a) as conditional assignments;
   b) manipulation (bunch of sets/assignment on the same object, no relationships);
   c) transformer (reading values from one object, setting (assignment) the value on another object); and
   d) routing (reading values from one object, calling a separate function/method based on condition).
 3) Based on classification determine the object types and whether any of them are in the medical domain by lexical classification or manual annotation, or NLP parsing of comments;
 4) Determine the object types in the code and their relationships (affects, conditionally determines, routes to);
 5) Match the entity relationships to corpora for the domain:
   a) If they match assign a weight based on the type of block and the relationship match;
   b) Assign weight based on the property type match and the classification types (assignment has similar or same property in code and corpora); and
   c) If they do not match assign a lower weight.

6) Based on the weighting and the object types match in the corpora determine whether it should be deemed within the requirement (FDA medical algorithms and how much); and 7) Show blocks of code identified as potential FDA Medical algorithm with code reasoning based on classification and match with evidence to corpora statements and annotations (tuple, relationships) from corpora.

For example, in a medical context, a medical term, such as "anemia" might be found in the code, such as a programming statement like:

"public AdverseEvent gradeAnemia(Patient p, List<LabReport> labs { . . . "

Here, the term "anemia," a medically relevant term, is found in the code and any software compliance guidelines regarding such term would be found and processed accordingly.

At step 430, the process identifies the code section as being either domain-specific or general purpose. The identification of the code section is also written to memory area 420. In one embodiment, the selected code section is searched for keywords pertaining to the domain. If any such keywords are found, then the block is identified as domain-specific, otherwise the block is identified as a general purpose code section. In a further embodiment, non-program language terms (e.g., variables, function names, etc.) are compared to such non-program language terms found in previously ingested source code files. Furthermore, in this embodiment, the QA system can be utilized to ask natural language questions such as "is the term 'patient_name' domain specific?" with the QA system answering the question based upon the extent of the knowledge base of already-ingested source code files.

At step 435, the process selects the first program construct in the selected code section (e.g., variable, class, etc.). The selected program construct is stored in memory area 440. At step 445, the process identifies the selected construct as either being domain-specific or general purpose with the identification being performed in a similar fashion as the identification of the code section itself (e.g., utilizing keywords, comparing such constructs to previously ingested constructs from other source code files, etc.). The identification of the construct as being either domain-specific or general purpose is also stored in memory area 440. The process determines as to whether there are more program constructs in the selected code section to process (decision 450). If there are more program constructs in the selected code section to process, then decision 450 branches to the 'yes' branch which loops back to select and process the next program construct from the selected code section. This looping continues until there are no more program constructs in the selected code section to process, at which point decision 450 branches to the 'no' branch for further processing.

At step 455, the process maps relationships between the selected code section and other code sections. For example, the selected code section may call or reference another code section or the selected code section may be a function or procedure that is called or referenced by other code sections. Such relationship data between code sections is stored in memory area 460.

The process determines as to whether there more additional code sections in the selected source code file to process (decision 465). If there are more additional code sections in the selected source code file to process, then decision 465 branches to the 'yes' branch which loops back to select and process the next code section as described above. This looping continues until there are no more code sections in the selected source code file to process, at which point decision 465 branches to the 'no' branch and processing continues.

At step 470, the process ingests the source code from memory area 410, the code section classification data from memory area 420, the program construct data from memory area 440, and the relationship data from memory area 440 into the QA system's corpus, or knowledge base, 106. The process then determines as to whether there are more source code files in archive 340 to process and ingest as described above (decision 475). If there are more source code files to process and ingest, then decision 475 branches to the 'yes' branch which loops back to select and process the next domain-specific source code file. This looping continues until there are no more source code files to process, at which point decision 475 branches to the 'no' branch at which point processing ends at 495.

Figure 5:
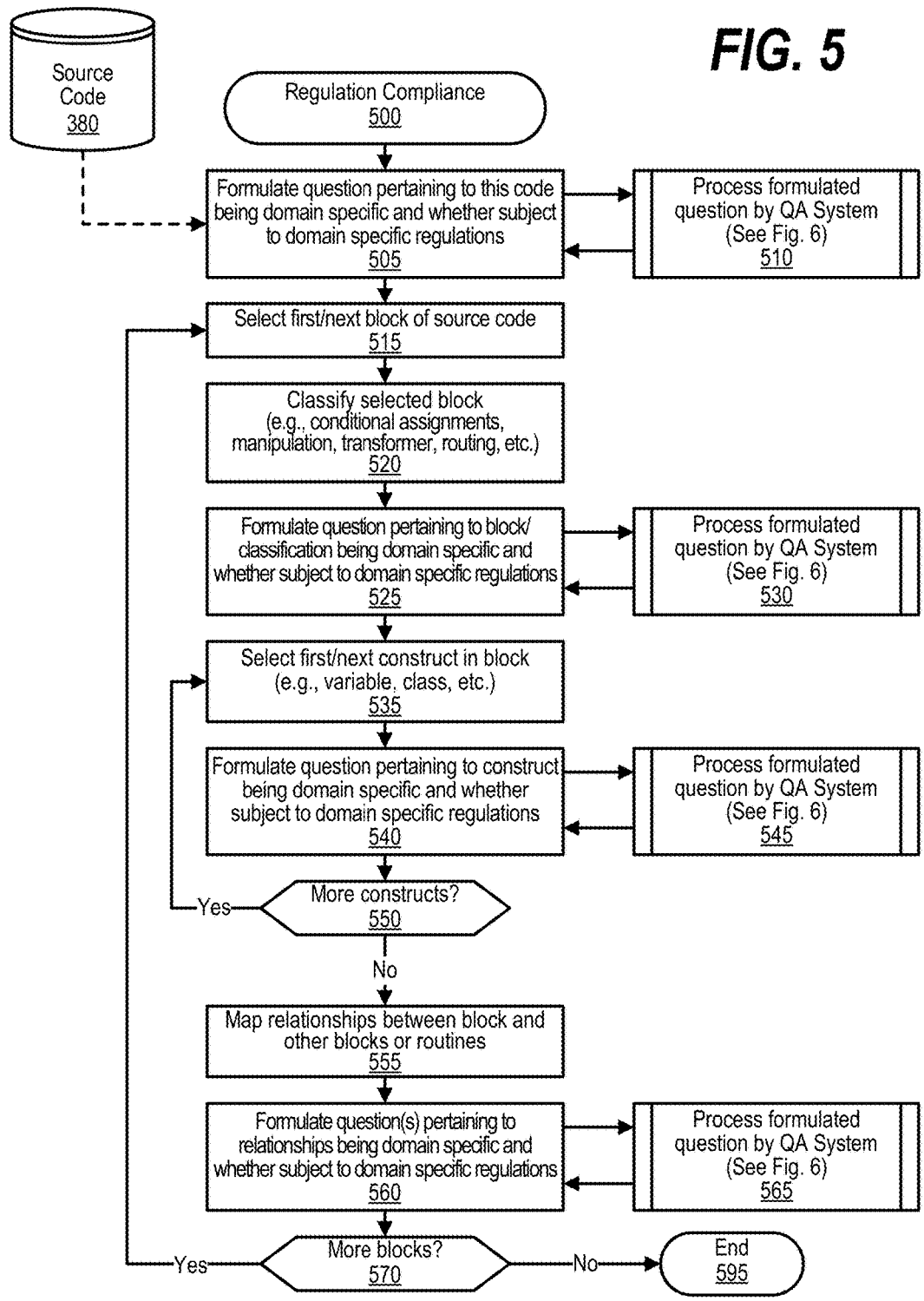
FIG. 5 is an exemplary flowchart that performs steps to comply with various regulations related to software that is being constructed.

FIG. 5 is an exemplary flowchart that performs steps to comply with various regulations related to software that is being constructed. FIG. 5 processing commences at 500 and shows the steps taken by a process that performs a routine that analyzes a new source code file being developed for a domain and identifies regulations that apply to the source code file.

At step 505, the process formulates a question pertaining to the new source code file as being domain specific and whether the new source code file is subject to domain specific regulations. At predefined process 510, the process performs the Process Formulated Question by QA System Routine (see FIG. 6 and corresponding text for processing details).

At step 515, the process selects the first code section from new source code file 380. At step 520, the process classifies the selected code section similar to the classification step 425 shown in FIG. 4 (e.g., conditional assignments, manipulation, transformer, routing, etc.). At step 525, the process formulates a question pertaining to the selected code section and the code section classification as being domain specific and whether the code section is subject to domain specific regulations. At predefined process 530, the process again performs the Process Formulated Question by QA System Routine (see FIG. 6 and corresponding text for processing details), this time processing the question formulated in step 525.

At step 535, the process selects the first programming construct from the selected code section (e.g., variable, class, etc.). At step 540, the process formulates a question pertaining to the selected programming construct being domain specific and whether the selected program construct is subject to domain specific regulations. At predefined process 545, the process again performs the Process Formulated Question by QA System Routine (see FIG. 6 and corresponding text for processing details), this time processing the question formulated in step 540.

The process determines as to whether there are more program constructs in the selected code section to process (decision 550). If there are more program constructs in the selected code section to process, then decision 550 branches to the 'yes' branch which loops back to select and process the next program construct from the selected code section. This looping continues until there are no more program constructs to process, at which point decision 550 branches to the 'no' branch for further processing.

At step 555, the process maps the relationships between the selected code section and other code sections or routines.

For example, the selected code section may call or reference other code sections or routines. In addition, the selected code section may be a routine or function that is called or referenced by other code sections. At step 560, the process formulates question(s) pertaining to the mapped relationships as being domain specific and whether such relationships are subject to domain specific regulations. At predefined process 565, the process again performs the Process Formulated Question by QA System Routine (see FIG. 6 and corresponding text for processing details), this time processing the question formulated in step 560.

The process determines as to whether there are more code sections in the new source code file to process (decision 570). If there are more code sections in the new source code file to process, then decision 570 branches to the 'yes' branch which loops back to select and process the next code section as described above. This looping continues until there are no more code sections to process, at which point decision 570 branches to the 'no' branch and processing ends at 595.

Figure 6:
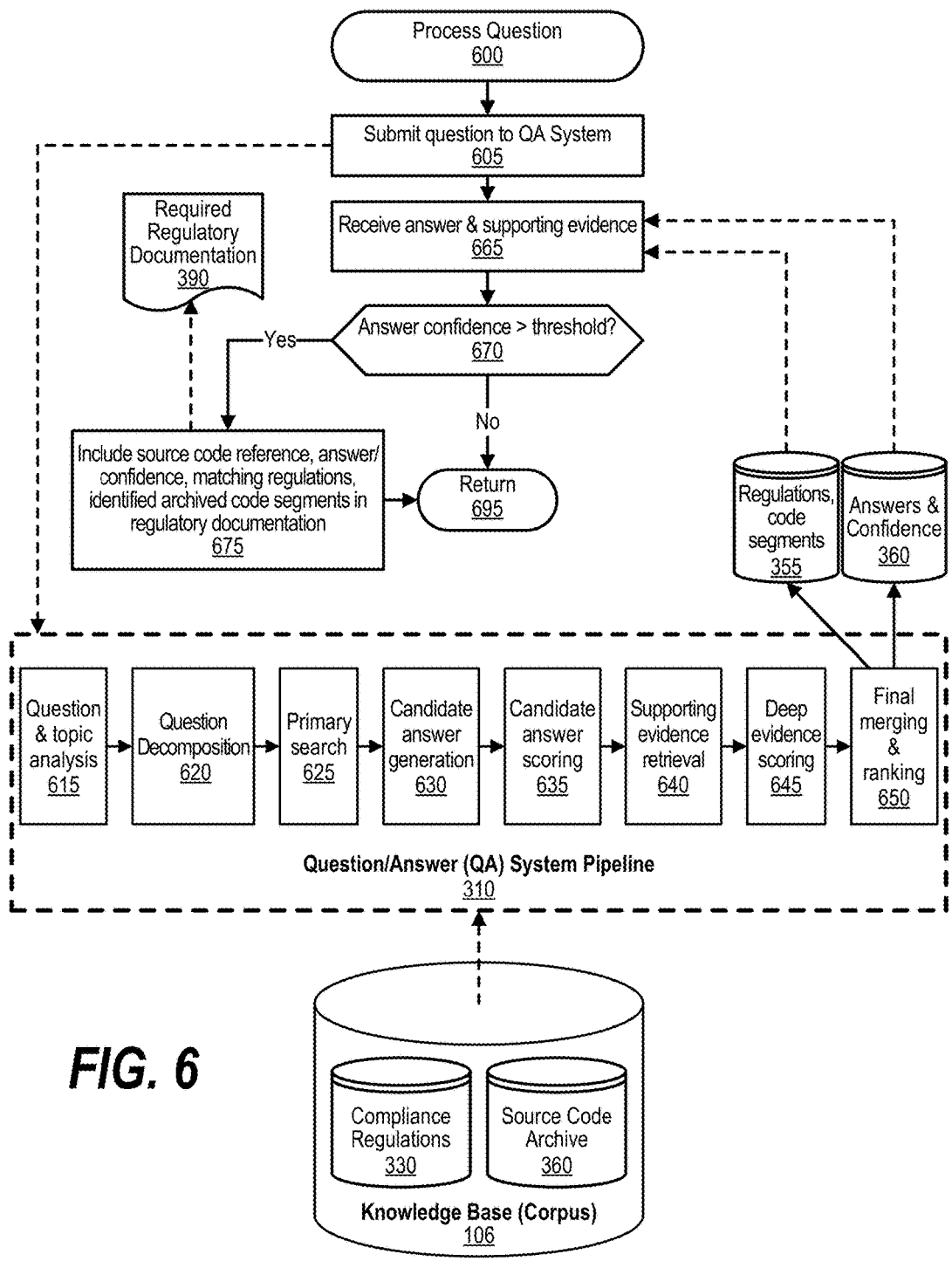
FIG. 6 is an exemplary flowchart that processes formulated questions pertaining to code using a question/answering (QA) system.

FIG. 6 is an exemplary flowchart that processes formulated questions pertaining to code using a question/answering (QA) system. FIG. 6 processing commences at 600 and shows the steps taken by a process that performs a routine that processes a formulated question using the QA system. At step 605, the process submits the formulated question to the QA System where it is processed by QA system pipeline 310.

QA system pipeline includes a number of processes that break the submitted question down in order to search the QA system's knowledge base 106 for an answer to the submitted question. As shown in FIG. 5, the submitted questions are formulated in a natural language format, such as "is the term 'patient_record' a domain specific term?" and the like depending on the aspect of the source code file that is being analyzed. At step 615, the QA system pipeline commences and first performs a question and topic analysis. Next, at step 620, the QA system pipeline performs a question decomposition process. At step 625, the QA system pipeline next performs a primary search for the submitted question using knowledge base 106. At step 630, the QA system pipeline then generates candidate answers to the submitted question. At step 635, the QA system pipeline scores the candidate answers. At step 640, the QA system pipeline retrieves supporting evidence from the knowledge base (corpus). At step 645, the QA system pipeline performs a deep evidence scoring process using the knowledge base. At step 650, the QA system pipeline performs a final merging and ranking resulting in one or more candidate answers as well as a confidence value pertaining to the various candidate answers.

Candidate answers with low confidence values are filtered out at this point in the process. The answers and their respective confidence values are stored in data store 360. In addition, references to specific regulations are written to data store 355 along with the respective code section(s) to which the regulations apply.

At step 665, the process receives the response from the QA system. The response includes answers, confidence values, and supporting evidence as well as the cited regulations and the code sections, constructs, or relationships to which the regulations apply. The process determines as to whether the answer's confidence value is greater than an established threshold (decision 670). If the answer's confidence value is greater than an established threshold, then decision 670 branches to the 'yes' branch whereupon, at step 675, the step writes the code section and/or construct and the domain-specific regulation to required regulatory documentation 390 with the domain-specific regulation being the regulation, or regulations, that apply to the code section, constructs, or relationships. On the other hand, if the answer's confidence value is less than the established threshold or the answer indicates that the code section, construct, or relationship are general purpose and not domain specific, then decision 670 branches to the 'no' branch bypassing step 675. Processing then returns to the calling routine (see FIG. 5) at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory having executable instructions stored thereon and a processor, where the processor executes the instructions to perform the method steps, the method steps comprising:
   building a domain-specific knowledge base of a domain by ingesting a plurality of source code files into the domain-specific knowledge base utilized by a question/answering (QA) system, wherein the ingesting further comprises:
   ingesting a set of software compliance regulations corresponding to the domain into the domain-specific knowledge base;
   selecting one of the plurality of source code files that includes a plurality of source code sections;
   classifying one of the plurality of source code sections as a domain-specific source code section; and
   classifying a construct in the domain-specific source code section as a domain-specific construct;
   retrieving a new source code file that comprises a plurality of new source code sections, wherein a selected one of the plurality of new source code sections includes a new construct;
   generating a natural language question based on the new construct; and
   processing, by the QA system, the natural language question using the domain-specific knowledge base, wherein the processing further comprises:
   matching the new construct to the domain-specific construct;

determining, in response to the matching, that the selected source code section is subject to the ingested set of software compliance regulations; and generating an answer, in response the determining, that indicates the new source code section is subject to the set of software compliance regulations.

2. The method of claim 1 further comprising:

identifying one or more domain-specific relationships between the plurality of new code sections of the new source code file; and using the QA system, analyzing compliance of the new source code file by further determining whether the identified one or more domain-specific relationships are subject to the ingested set of software compliance regulations.

3. The method of claim 1 further comprising:

formulating a different natural language question pertaining to the new source code file being domain specific and subject to the ingested set of software compliance regulations;

submitting the different natural language question to the QA system; and receiving a response from the QA system that indicates whether the new source code file is subject to the ingested set of software compliance regulations.

4. The method of claim 1 further comprising:

receiving, from the QA system, a confidence value corresponding to the answer; and in response to the confidence value exceeding a threshold, generating a report that indicates the new source code section is subject to the ingested set of software compliance regulations.

5. The method of claim 4 further comprising:

including the set of software compliance regulations in the report.

* * * * *